(12) United States Patent
Furuya

(10) Patent No.: US 9,989,778 B2
(45) Date of Patent: Jun. 5, 2018

(54) IMAGE DISPLAY DEVICE

(71) Applicant: Panasonic Intellectual Property Management Co., Ltd., Osaka (JP)

(72) Inventor: Hiroyuki Furuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/345,415

(22) Filed: Nov. 7, 2016

(65) Prior Publication Data
US 2017/0146809 A1     May 25, 2017

(30) Foreign Application Priority Data

Nov. 25, 2015  (JP) ................................. 2015-229239

(51) Int. Cl.
*H04N 9/31* (2006.01)
*G02B 27/01* (2006.01)
(Continued)

(52) U.S. Cl.
CPC .............. *G02B 27/48* (2013.01); *B60K 35/00* (2013.01); *G02B 26/105* (2013.01); *G02B 27/0101* (2013.01); *G03B 21/2033* (2013.01); *G03B 21/2046* (2013.01); *G03B 21/28* (2013.01); *G03B 21/625* (2013.01);
(Continued)

(58) Field of Classification Search
CPC .. H04N 9/3129; H04N 9/3132; H04N 9/3135; H04N 9/3161; H04N 9/3152; H04N 9/3164; G02B 27/48; G02B 27/0101; G02B 26/105; G02B 2027/011;
(Continued)

(56) References Cited

U.S. PATENT DOCUMENTS 8,177,369 B2 * 5/2012 Kaise ................ G02F 1/133553
                                                                       349/5
2008/0018808 A1    1/2008 Seki
(Continued)

FOREIGN PATENT DOCUMENTS

JP   2008-026616    2/2008
JP   2013-064985    4/2013
(Continued)

*Primary Examiner* — Ryan Howard
(74) *Attorney, Agent, or Firm* — McDermott Will & Emery LLP

(57) ABSTRACT

An image display device includes a light source, a scanner, a screen, a virtual image optical system and a screen incident angle correcting optical system. The light source emits laser light. The scanner scans the laser light. An image is formed on the screen by the scanned laser light. The virtual image optical system generates a virtual image of the image by the laser light having transmitted through the screen. The screen incident angle correcting optical system orients the scanned laser light toward the screen. The scanner performs at least first scanning and second scanning that has a scanning direction different from a scanning direction of the first scanning. The screen includes a lenticular lens having a lens pitch in a direction parallel to the first scanning. The lens pitch of the lenticular lens is larger than a beam diameter of the laser light near a light receiving surface of the screen.

11 Claims, 14 Drawing Sheets

(51) Int. Cl.
  *G02B 27/48* (2006.01)
  *B60K 35/00* (2006.01)
  *G02B 26/10* (2006.01)
  *G03B 21/20* (2006.01)
  *G03B 21/28* (2006.01)
  *G03B 21/625* (2014.01)

(52) U.S. Cl.
  CPC .......... *H04N 9/3129* (2013.01); *H04N 9/3155* (2013.01); *H04N 9/3161* (2013.01); *H04N 9/3164* (2013.01); *B60K 2350/2047* (2013.01); *B60K 2350/2052* (2013.01); *B60K 2350/2056* (2013.01); *G02B 2027/011* (2013.01)

(58) Field of Classification Search
  CPC ............ G02B 2027/0112; G03B 21/28; G03B 21/2033; B60K 2350/2047; B60K 2350/2052
  USPC ............................................ 359/13, 630–633
  See application file for complete search history.

(56) References Cited

U.S. PATENT DOCUMENTS

| | | |
|---|---|---|
| 2011/0235003 A1 | 9/2011 | Konno |
| 2012/0218641 A1 | 8/2012 | Kikuchi et al. |
| 2013/0050655 A1 | 2/2013 | Fujikawa et al. |
| 2015/0277115 A1* | 10/2015 | Inamoto ............... G02B 3/0056 359/619 |
| 2016/0052293 A1* | 2/2016 | Seshaiya Doraiswamy Chandrasekar ........ B41J 2/4753 347/175 |
| 2016/0313562 A1* | 10/2016 | Saisho ............... G02B 27/0179 |
| 2016/0320615 A1* | 11/2016 | Nakamura ........... G02B 3/0043 |

FOREIGN PATENT DOCUMENTS

| | | |
|---|---|---|
| WO | 2009/019973 | 2/2009 |
| WO | 2012/117495 | 9/2012 |

* cited by examiner

| LENS PITCH (Px) | SPECKLE CONTRAST | | DISPLAY ROUGHNESS (VISUALLY) | |
|---|---|---|---|---|
| LASER BEAM DIAMETER (D) | CENTER | OUTER CIRCUMFERENCE | CENTER | OUTER CIRCUMFERENCE |
| 1.5 | 6.5% | 6.8% | ○ | × |
| 1.25 | 6.7% | 7.4% | ○ | × |
| 1.15 | 6.8% | 7.9% | ○ | △ |
| 1.0 | 7.0% | 8.5% | ○ | ○ |

○ : PIXELS ARE NOT DISTINCT
△ : PIXELS ARE VISIBLE BUT DO NOT INFLUENCE DISPLAY CONTENTS
× : DISPLAY IMAGE BECOMES SPARSE AND DISPLAY CONTENTS ARE INFLUENCED

FIG. 4B
Related Art

| LENS PITCH (Px) | SPECKLE CONTRAST | | DISPLAY ROUGHNESS (VISUALLY) | |
|---|---|---|---|---|
| LASER BEAM DIAMETER (D) | CENTER | OUTER CIRCUMFERENCE | CENTER | OUTER CIRCUMFERENCE |
| 1.5 | 6.5% | 8.0% | × | × |
| 1.25 | 6.7% | 9.0% | △ | × |
| 1.15 | 6.8% | 10.0% | ○ | × |
| 1.0 | 7.0% | 12.0% | ○ | △ |

○ : PIXELS ARE NOT DISTINCT
△ : PIXELS ARE VISIBLE BUT DO NOT INFLUENCE DISPLAY CONTENTS
× : DISPLAY IMAGE BECOMES SPARSE AND DISPLAY CONTENTS ARE INFLUENCED

FIG. 8A

| LENS PITCH (Px) / LASER BEAM DIAMETER (D) | SPECKLE CONTRAST | | DISPLAY ROUGHNESS (VISUALLY) | |
|---|---|---|---|---|
| | CENTER | OUTER CIRCUMFERENCE | CENTER | OUTER CIRCUMFERENCE |
| 2.0 | 6.3% | 6.3% | ○ | ○ |
| 1.5 | 6.5% | 6.5% | ○ | ○ |
| 1.25 | 6.7% | 6.7% | ○ | ○ |
| 1.15 | 6.8% | 6.8% | ○ | ○ |
| 1.0 | 7.0% | 7.0% | ○ | ○ |

○ : PIXELS ARE NOT DISTINCT
△ : PIXELS ARE VISIBLE BUT DO NOT INFLUENCE DISPLAY CONTENTS
× : DISPLAY IMAGE BECOMES SPARSE AND DISPLAY CONTENTS ARE INFLUENCED

FIG. 8B

| LENS PITCH (Px) / LASER BEAM DIAMETER (D) | SPECKLE CONTRAST | | DISPLAY ROUGHNESS (VISUALLY) | |
|---|---|---|---|---|
| | CENTER | OUTER CIRCUMFERENCE | CENTER | OUTER CIRCUMFERENCE |
| 1.5 | 6.5% | 6.5% | △ | × |
| 1.25 | 6.7% | 6.7% | ○ | ○ |
| 1.15 | 6.8% | 6.8% | ○ | ○ |
| 1.0 | 7.0% | 7.0% | ○ | ○ |

○ : PIXELS ARE NOT DISTINCT
△ : PIXELS ARE VISIBLE BUT DO NOT INFLUENCE DISPLAY CONTENTS
× : DISPLAY IMAGE BECOMES SPARSE AND DISPLAY CONTENTS ARE INFLUENCED

1100

IMAGE DISPLAY DEVICE

BACKGROUND

1. Technical Field

The present disclosure relates to an image display device which is preferable for displaying virtual images via a half mirror, for example.

2. Description of the Related Art

In recent years, an image display device which causes a virtual image optical system formed by combining surface reflection (or half mirror) on a glass surface and a free-form surface mirror to display video images on a space is being developed.

Particularly, application to an image display device mounted on a movable body such as an automobile, which is referred to as a head-up display, is expected. For example, a head-up display mounted on an automobile projects light modulated based on image information, to a windshield (front glass), and reflection light of the light is irradiated on the driver's eyes. Consequently, the driver can see a virtual image ahead of the windshield. For example, a vehicle speed, an outdoor temperature and the like are displayed as a virtual image. Recently, it also has been studied to display a navigation image and an image which calls for attention to existing passengers as a virtual image for a driver.

Laser light sources such as semiconductor lasers are used as light sources for the head-up display. According to this configuration, laser light is modulated according to a video signal, and laser light scans the screen. The screen diffuses the laser light, and widens a light area to be irradiated on the driver's eyes. Consequently, even when the driver moves the head more or less, the eyes do not go out of an irradiation area, so that the driver can stably see images (virtual images) well.

By using the laser light sources, it is possible to make small an optical system that makes laser beams scan on the screen. Further, a combination with a virtual image optical system having a larger optical magnification makes it possible to display large virtual images even in the case of a smaller main body dimension. Hence, it is expected to increase the number of models of the vehicle on which head-up displays are mounted.

However, there is a problem that using the laser light sources as light sources generates interference noise, i.e., so-called speckle noise due to coherence of laser light, and a display image becomes glaring and is hardly viewed.

Many technical experts have devised measures for reducing the speckle noise and proposed some methods for the speckle noise problem so far.

For example, Unexamined Japanese Patent Publication No. 2008-26616 discloses a speckle noise reducing method for applying a polarization rotation coating to microlens arrays and making a lens dimension equal to or more than a beam diameter.

Further, International Publication No. 2012/117495 discloses a configuration where a screen is configured by disposing two microlens arrays of hexagonal lattice shapes to oppose to each other and shifting an angle of the second microlens array to reduce speckle noise.

Unexamined Japanese Patent Publication No. 2013-64985 discloses a configuration where speckle noise is reduced by determining a lens pitch such that a pitch between a plurality of optical elements aligned in a lattice shape is a pupil diameter of an eyeball or less.

International Publication No. 2009/019973 proposes a technique for canceling speckle noise by screen vibration, and discloses that speckle noise is reduced when a spot size satisfies a relationship of spot size<screen movement amount<πxspot size 2÷(2xlaser wavelength).

SUMMARY

An image display device according to the present disclosure includes a light source, a scanner, a screen, a virtual image optical system and a screen incident angle correcting optical system. The light source emits laser light. The scanner scans the laser light emitted from the light source. An image is formed on the screen by the laser light scanned with the scanner. The virtual image optical system generates a virtual image of the image by the laser light having transmitted through the screen. The screen incident angle correcting optical system orients the laser light scanned with the scanner toward the screen. The scanner performs at least first scanning and second scanning that has a scanning direction different from a scanning direction of the first scanning, and makes a scanning speed of the first scanning higher than a scanning speed of the second scanning. Furthermore, the virtual image optical system generates the virtual image larger than the image formed on the screen. The screen incident angle correcting optical system makes the laser light perpendicularly incident to a light receiving surface of the screen. The screen includes a lenticular lens having a lens pitch in a direction parallel to the first scanning. The lens pitch of the lenticular lens is larger than a beam diameter of the laser light near the light receiving surface of the screen.

The image display device according to the present disclosure can reduce speckle noise while suppressing a decrease in a resolution of display images irrespectively of display portions of the images.

BRIEF DESCRIPTION OF THE DRAWINGS

FIGS. 4A to 4B are tables for comparing various evaluation indices of the conventional image display device;

FIGS. 8A and 8B are tables for comparing various evaluation indices of the image display device according to the exemplary embodiment;

DETAILED DESCRIPTION OF EMBODIMENTS

Figure 1A:
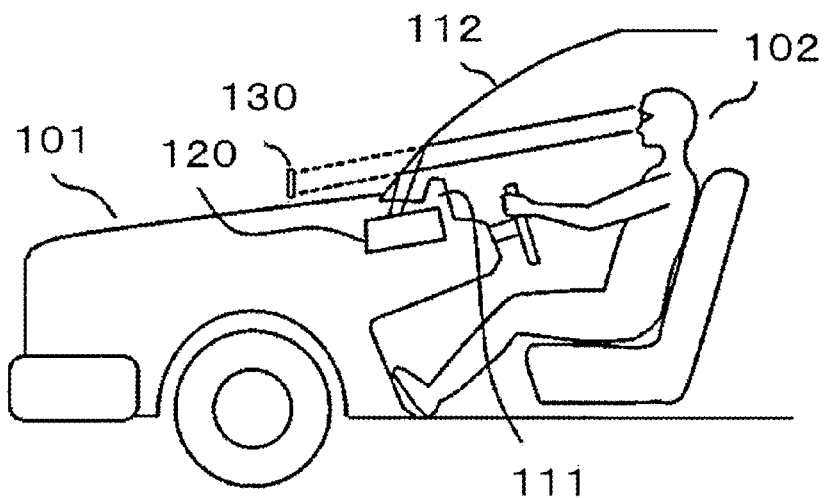
FIGS. 1A to 1C are views schematically illustrating use aspect of an image display device according to an exemplary embodiment.

Prior to description of an exemplary embodiment of the present disclosure, a problem of a conventional configuration will be described. Configurations of Unexamined Japanese Patent Publication No. 2008-26616 and Unexamined Japanese Patent Publication No. 2013-64985 have a problem that, when a magnification of a virtual image optical system increases, a displayed video image becomes rough, and speckle noise can be canceled at a center of the displayed video image yet cannot be canceled at surroundings.

Meanwhile, according to a configuration of International Publication No. 2012/117495, it is necessary to strictly adjust a positional relationship between two microlens arrays. Further, when the two microlens arrays are disposed at positions to suppress speckle noise, there are problems that a resolution of display images lowers, and video images blur and lack in clarity.

A configuration of International Publication No. 2009/019973 also has a problem that speckle noise reduction effect changes depending on environment such as brightness in the surroundings in which video images are viewed.

Further, the configuration of International Publication No. 2009/019973 has a problem that the screen is mechanically swung, and therefore video images are temporarily defocused, blur and lack in clarity and reliability lowers since a mechanical movable part is provided.

In view of the problems, the present disclosure provides an image display device which reduces speckle noise while suppressing a decrease in a resolution of display images.

The image display device according to the exemplary embodiment of the present disclosure will be described below with reference to the drawings. X, Y and Z axes orthogonal to each other are optionally added to each drawing for ease of description. Components assigned the same reference numerals in the drawings will not be described in some cases.

EXEMPLARY EMBODIMENT

The present exemplary embodiment will be described below with reference to the drawings.

Figure 1B:
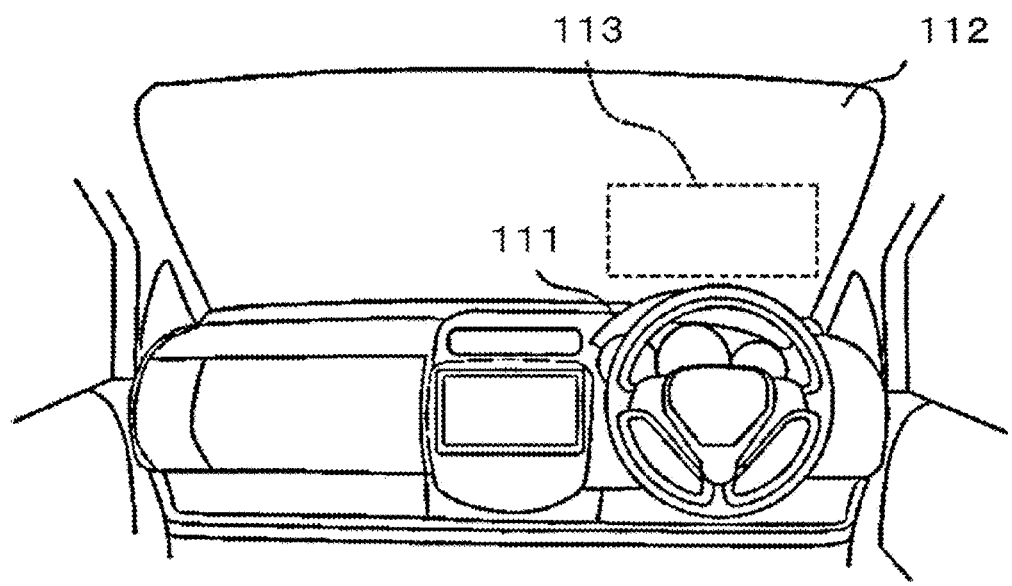
Figure 1C:
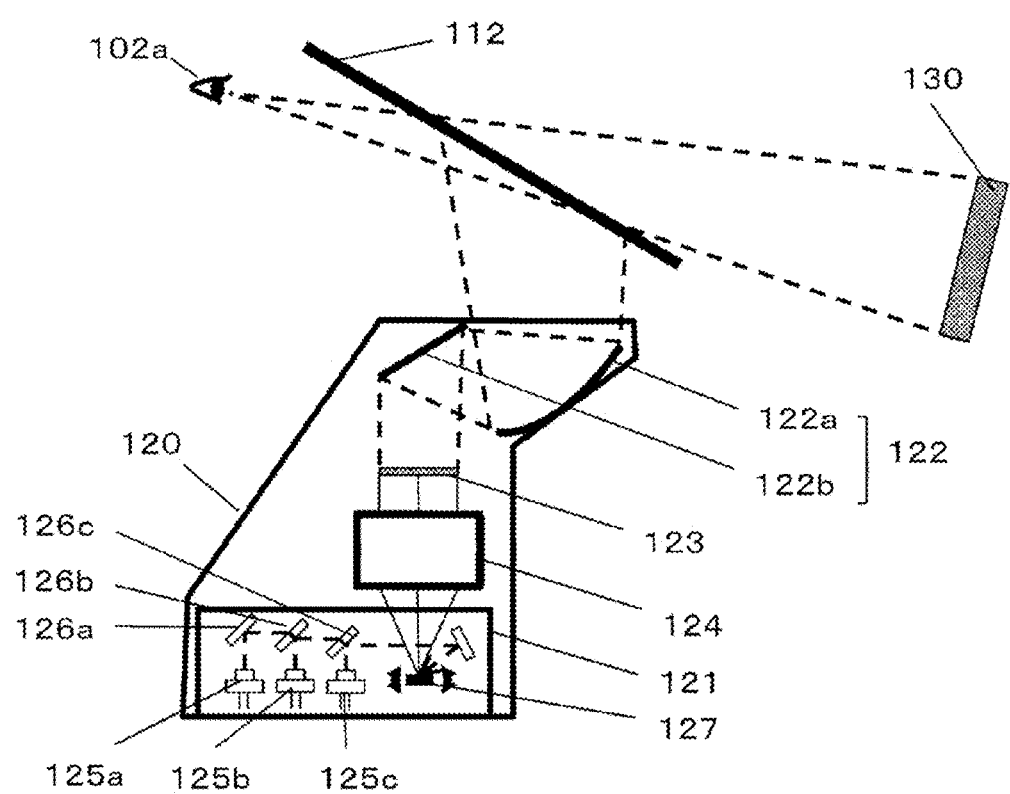

FIGS. 1A to 1C are views schematically illustrating use aspect of image display device 120 according to the present exemplary embodiment. FIG. 1A is a schematic view illustrating a perspective view of an inside of vehicle 101 from a side of vehicle 101. FIG. 1B is a view illustrating a front in a scanning direction from the inside of vehicle 101. FIG. 1C is a view illustrating an internal configuration of image display device 120. In the present exemplary embodiment, the present disclosure is applied to an in-vehicle head-up display.

As illustrated in FIG. 1A, image display device 120 is disposed inside dashboard 111 of vehicle 101.

As illustrated in FIGS. 1A and 1B, image display device 120 projects laser light modulated based on a video signal to projection area 113 disposed closer to a driver's seat at a lower side of windshield 112. The laser light is reflected on projection area 113, and is irradiated on a horizontally long area (eyebox area) around eye positions of driver 102. Thus, predetermined image 130 is displayed as a virtual image in a field of view ahead of driver 102. Driver 102 can see image 130 which is a virtual image overlaid on a scene ahead of windshield 112. That is, image display device 120 forms image 130 which is the virtual image on a space ahead of projection area 113 of windshield 112.

As illustrated in FIG. 1C, image display device 120 includes scanning optical module 121, virtual image optical system 122, screen 123, and a telecentric f-θ lens (referred to as "f-θ lens" 124 below) serving as a screen incident angle correcting optical system. Scanning optical module 121 includes laser light source 125a, laser light source 125b and laser light source 125c as laser light sources which respectively emit red, blue and green, and emits laser light modulated based on a video signal. Laser light emitted from each laser light source is formed as a coaxial laser beam via combining mirror 126a, combining mirror 126b and combining mirror 126c, and is irradiated on scanning mirror 127.

Subsequently, the laser beam is caused to scan on screen 123 via f-θ lens 124 by scanning mirror 127. Scanning mirror 127 includes two rotation axes of an axis (referred to as a high-speed axis for ease of description) for making reciprocating movement at a resonance frequency of approximately 20 kHz, and an axis (referred to as a low-speed axis for ease of description) for making reciprocating movement at an image frame rate (60 Hz in the exemplary embodiment).

Hereinafter, the present exemplary embodiment will be described such that a direction along the high-speed axis is an x axis and a direction along the low-speed axis is a y axis. The x axis according to the present exemplary embodiment corresponds to a scanning direction of first scanning, and the y axis corresponds to a scanning direction of second scanning. Further, the x axis is orthogonal to the y axis, and a scanning speed in an x axis direction is higher than a scanning speed in a y axis direction.

Virtual image optical system 122 includes reflection surface 122a of a curved shape and reflection surface 122b of a planar shape. The laser light emitted from scanning optical module 121 is reflected by virtual image optical system 122 toward windshield 112 via f-θ lens 124 and screen 123. The laser light reflected by windshield 112 is irradiated on eyes 102a of driver 102. An optical system of scanning optical module 121 and virtual image optical system 122 are set to display image 130 with a predetermined size which is the virtual image ahead of windshield 112.

In this regard, by adopting a specific structure for screen 123 by providing f-θ lens 124 to image display device 120, it is possible to improve display quality of image 130. In this case, an enlarging magnification of virtual image optical system 122 is set between four times and thirty times, so that it is possible to further improve display quality of image 130.

Further, when an optical magnification of virtual image optical system 122 is higher, image 130 can be generated by using smaller image display device 120. Consequently, image display device 120 can be also mounted on vehicles having limited mounting spaces.

A case where the present disclosure is applied to a windshield head-up display which allows observation of a virtual image through a windshield has been described as an example in the present exemplary embodiment. However, the present disclosure can be applied to a combiner head-up display which allows observation of a virtual image through an optical part which is referred to as a combiner.

Further, in the present exemplary embodiment, scanning optical module 121 employs an optical configuration which uses a reciprocating mirror adopting a so-called MEMS (Micro Electro Mechanical System) structure which uses an effect of giving a distortion of a piezoelectric material, an electromagnetic force and static electricity. However, a configuration of operating laser light can also use a polygon mirror or a galvanometer mirror.

Further, when the optical magnification of virtual image optical system 122 is higher, it is possible to generate image 130 by using smaller image display device 120. As a result, it is possible to provide an effect that image display device 120 can be also mounted on vehicles having limited mounting spaces.

Next, a conventional image display device which uses microlens arrays for a screen will be described.

Figure 2A:
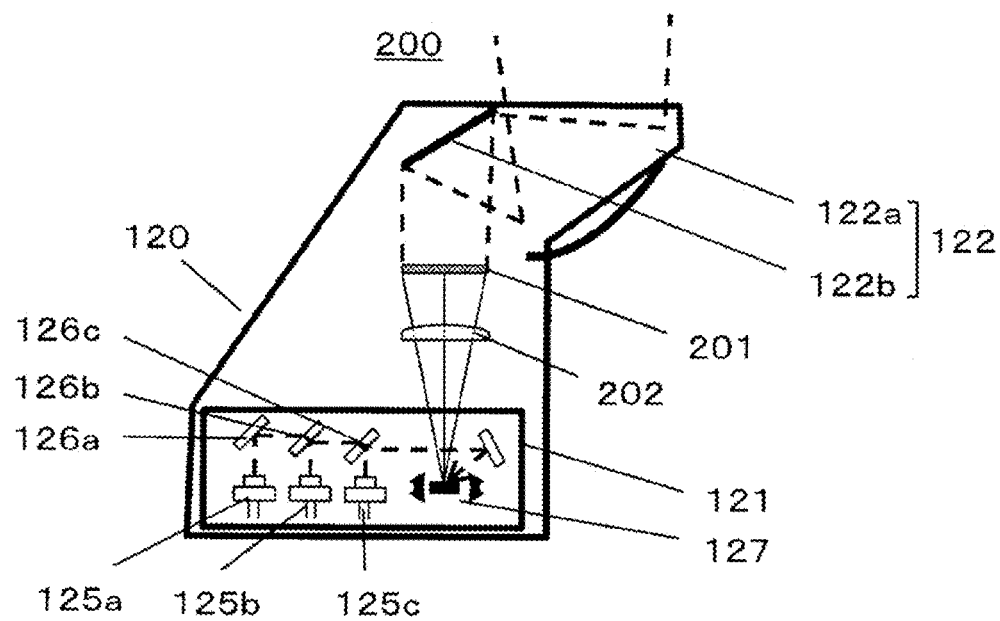
FIGS. 2A to 2C are views illustrating a conventional image display device.
Figure 2B:
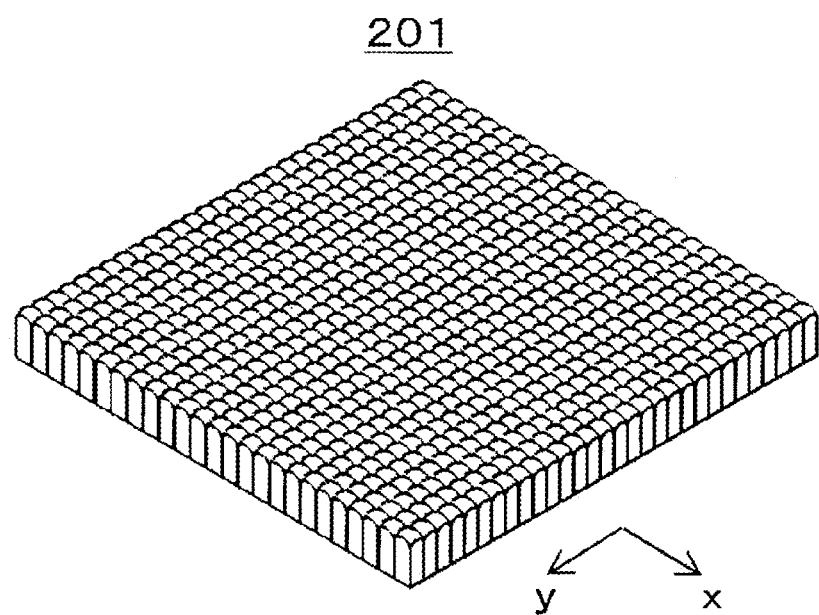
Figure 2C:
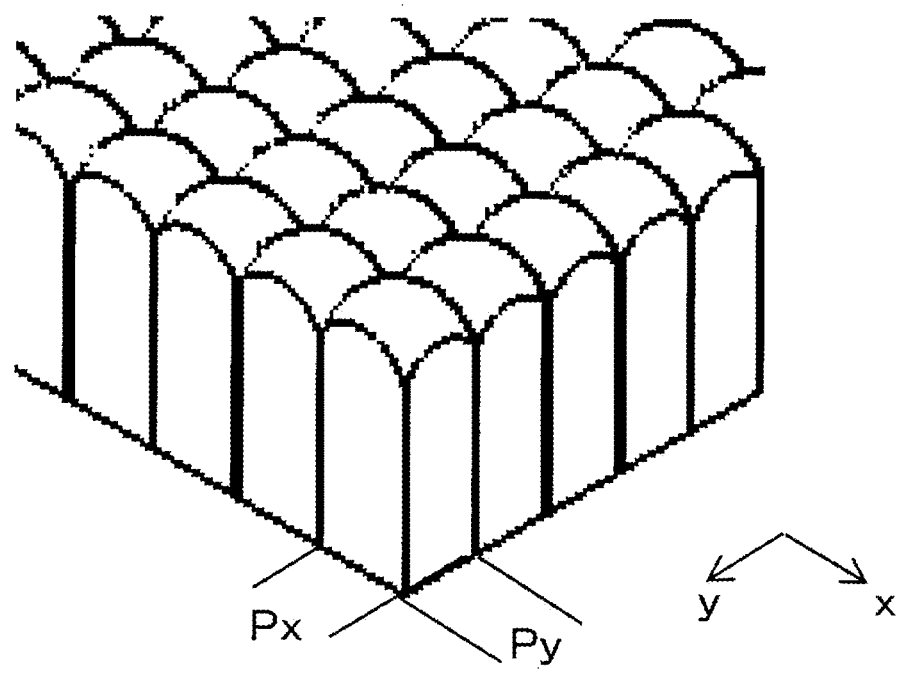

FIGS. 2A to 2C are views illustrating the conventional image display device. FIG. 2A is a view illustrating a configuration of the conventional image display device. FIG. 2B is a view illustrating screen 201 of the conventional image display device for which the microlens arrays are used. FIG. 2C is a view of enlarged screen 201 of the conventional image display device, and illustrates a relationship between a lens structure and lens pitches Px and Py.

According to the conventional configuration, general condenser lens 202 is provided as an illuminating optical system which illuminates screen 201 instead of f-θ lens 124 according to the present exemplary embodiment. Further, screen 201 for which the microlens arrays are used is provided as a screen instead of screen 123 according to the present exemplary embodiment.

Furthermore, each microlens array has a structure in which aspherical convex lenses of lattice structures are accumulated in the x direction and the y direction. In this regard, lens pitch Px is a lens pitch in the x axis direction which is the direction along the high-speed axis, and lens pitch Py is a lens pitch in the y axis direction which is the direction along the low-speed axis.

Figure 3:
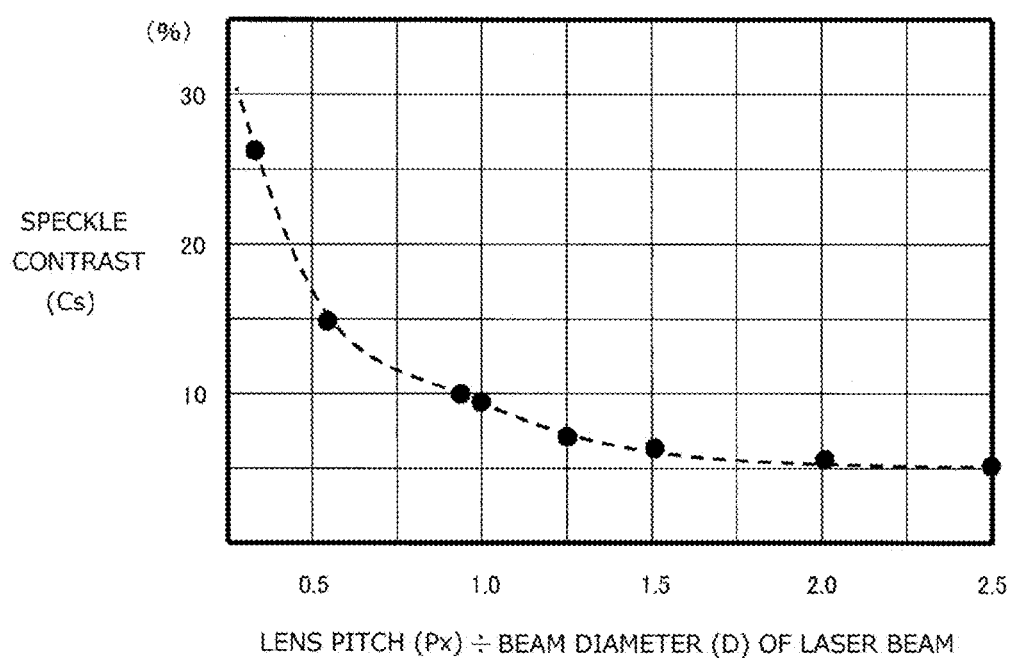
FIG. 3 is a graph for comparing various evaluation indices of the conventional image display device.

FIG. 3 is a graph for comparing various evaluation indices of the conventional image display device. The various evaluation indices in FIG. 3 are a lens pitch (Px), a beam diameter (D) of a laser beam and a speckle contrast (Cs).

FIG. 3 illustrates a result obtained by experimentally investigating a relationship between a value obtained by dividing the lens pitch (Px) by beam diameter D of the laser beam (full width at half maximum: FWHM value) illuminating screen 201, and the speckle contrast (Cs) which is one of indices indicating image display quality when the optical magnification of virtual image optical system 122 is set to four times in the configuration in FIG. 2A. Speckle noise is noise which generates multiple luminescent spots on a display image due to interference of laser light, and gives a glaring impression to a person (a driver in this application) who sees image 130. Further, the speckle contrast is an evaluation index indicating a difference between this luminescent spot and a dark image portion. In this regard, the laser beam diameter (D) illustrated in FIG. 3 indicates a value of a position of a beam waist condensed by condenser lens 202, i.e., a value near a light receiving surface of screen 201 (microlens array).

As illustrated in FIG. 3, it has become obvious that, as the value obtained by dividing the lens pitch (Px) by the beam diameter (D) of the laser beam becomes higher, the speckle noise is reduced. An index for indicating the speckle noise less distinct is that a speckle contrast value goes below 10%. When the lens pitch (Px) is equal to the beam diameter (D) of the laser beam, the speckle contrast value is 9.5% and an image has a less glaring impression. Further, it has been found that, when the lens pitch (Px) goes above 1.5 times the beam diameter (D) of the laser beam, the speckle contrast goes below 6%, and a value comparable to a case where laser light is not used for illumination (a LED or a lamp light source) can be obtained.

Figure 4C:
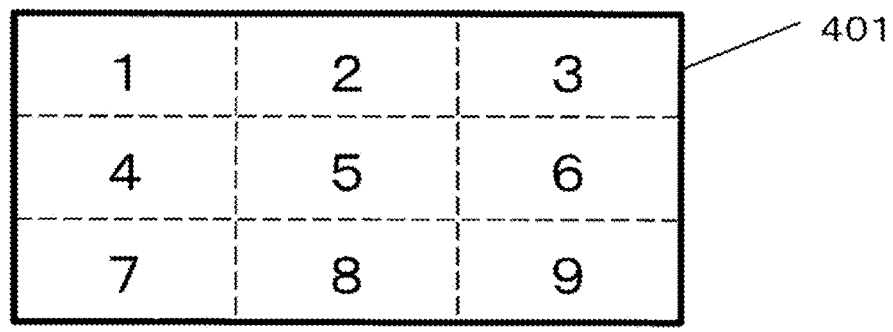
FIG. 4C is diagram illustrating areas obtained by dividing image display area 401 by nine.

However, it has become obvious for the first time that there are cases where improvement situations of glaring impressions caused by speckle noise differ between a center of displayed image 130 and an outer circumference of displayed image 130. Further, it has been found that the improvement situations of the glaring impression significantly change likewise according to the optical magnification of virtual image optical system 122. FIGS. 4A to 4C illustrate this relationship.

FIGS. 4A to 4B are tables for comparing various evaluation indices of the conventional image display device. The various evaluation indices in FIGS. 4A to 4B are the lens pitch (Px), the beam diameter (D) of the laser beam, the speckle contrast (Cs) and display roughness. FIG. 4A is a table for comparing the various evaluation indices when the optical magnification of virtual image optical system 122 is set to four times. Further, FIG. 4B is a table for comparing the various evaluation indices when the optical magnification of virtual image optical system 122 is set to twenty times.

FIG. 4C is a diagram illustrating areas obtained by dividing image display area 401 by nine, and a center indicates area 5 and an outer circumference indicates areas other than area 5.

When the optical magnification of virtual image optical system 122 illustrated in FIG. 4A is four times, the outer circumference (areas 1, 3, 7 and 9 in this case) has a higher speckle contrast value than a speckle contrast value of the center (area 5). Further, it has been found that a display image is thinned at the outer circumference, and the display roughness is seen to be rough. In this case, from both a viewpoint of a glaring impression of speckle noise and a viewpoint of display roughness of an image, the value which is obtained by dividing the lens pitch (Px) by the beam diameter (D) of the laser beam is tolerable to be only 1.0 and is up to 1.15 even if conditions are relaxed. It has been found that this phenomenon becomes more remarkable when the optical magnification of virtual image optical system 122 is increased.

Further, when the optical magnification of virtual image optical system 122 illustrated in FIG. 4B is twenty times, the glaring impression is not recognized when the value obtained by dividing the lens pitch (Px) by the beam diameter (D) of the laser beam is 1.25 times or more. In this case, it has been found that pixels become rough, and display quality lowers from another viewpoint. Hence, when the optical magnification is twenty times, a result is given that there is no value which is tolerable both from a viewpoint of a glaring impression of speckle noise and from a viewpoint of display roughness of an image, and which is obtained by dividing the lens pitch (Px) by the beam diameter of the laser beam (D).

Figure 5A:
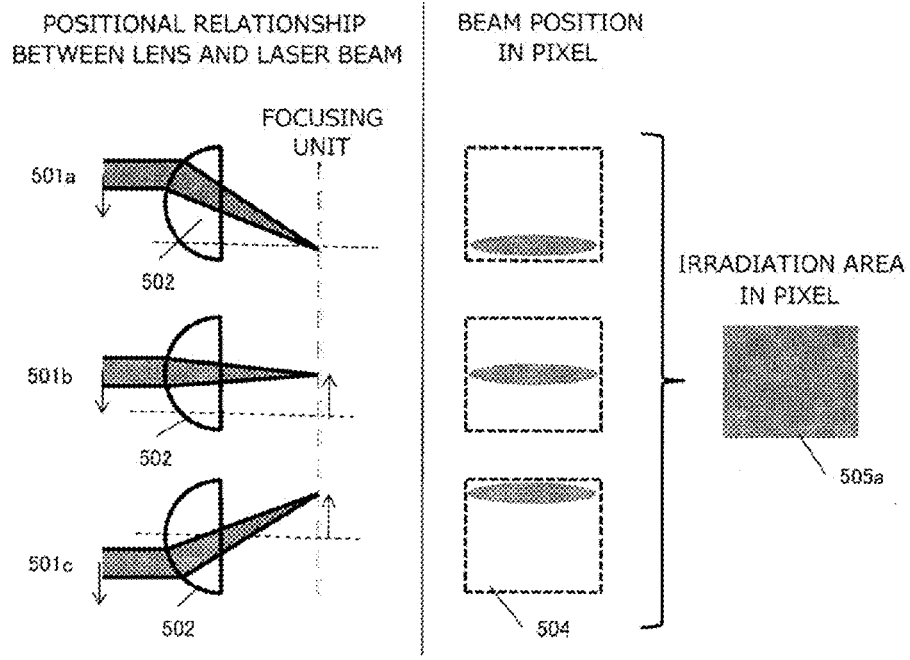
FIGS. 5A and 5B are views illustrating illumination states of pixels of the conventional image display device.
Figure 5B:
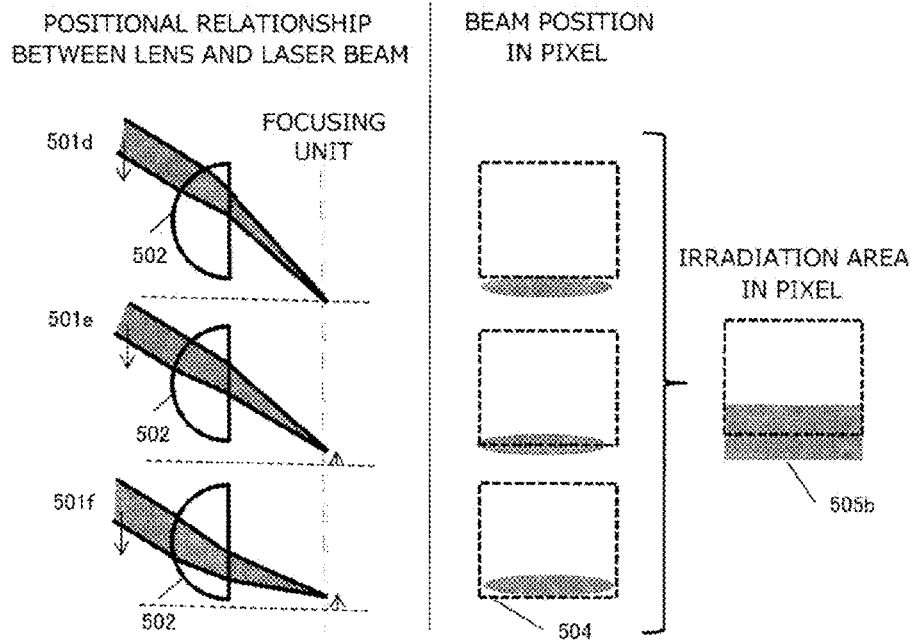

Results obtained by investigating why such a result is obtained by tracking light beams are illustrated in FIGS. 5A and 5B.

FIGS. 5A and 5B are views illustrating illumination states of pixels of the conventional image display device. FIG. 5A is a view schematically illustrating a situation at a center of screen 201, and FIG. 5B is a view schematically illustrating a situation at surroundings of screen 201.

In order of laser beams 501a, 501b and 501c, laser beams move through lens 502 on screen 201 at the center of screen 201 illustrated in FIG. 5A. In this case, it has been found that the laser beam is condensed (focused) on a focusing unit to form an image, but a focusing position also moves with movement of the laser beam, and the beam in this dotted line area moves with respect to one pixel 504 (dotted line) and is illuminated. Hence, it is found that one entire pixel 504 is uniformly irradiated as indicated in illumination area 505a in FIG. 5A at the center of screen 201.

Next, in order of laser beams 501d, laser beam 501e and laser beam 501f, laser beams move through lens 502 on screen 201 at the surroundings of screen 201 illustrated in FIG. 5B. In this case, each of laser beam 501d, laser beam 501e and laser beam 501f is incident obliquely to lens 502. Hence, compared to the center of screen 201 illustrated in FIG. 5A, a laser beam condensing position (focusing position) concentrates on one side area in this dotted area with respect to one pixel 504. As a result, it has been found that illumination area 505b is an area which is part of one pixel 504, and therefore entire pixel 504 cannot be uniformly illuminated.

In view of the above, it has been found that improvement situations of the glaring impressions (speckle noise) differ between the center of image 130 and the surroundings of image 130 because movement of a beam per pixel is small at the surroundings of screen 201 corresponding to the surroundings of image 130. Therefore, a change in an optical path is small and an effect of lowering interference is small. Further, it has been found that the reason why the image becomes rough at the surroundings of the screen is that pixels cannot be uniformly illuminated at the surroundings of the screen.

As the optical magnification of virtual image optical system 122 becomes high, an area which is not illuminated by a laser beam is enlarged, part of pixels which become dark without being illuminated become more distinct. Therefore, a tolerance for the presence of the area of the pixel which is not illuminated becomes low.

As a result of studying the experiment, it is important to make a laser beam substantially perpendicularly incident to the lens at all times of scanning in the x axis direction which is a high-speed scanning direction in order to improve such a situation. Hence, a tolerable incident angle of a laser beam with respect to the screen is desirably ±1.5° at scanning in the x axis direction.

Hence, the present exemplary embodiment employs a configuration where a screen incident angle correcting optical system (f-θ lens 124) which makes the laser beam perpendicularly incident to screen 123 illustrated in FIG. 1C is provided.

Figure 6:
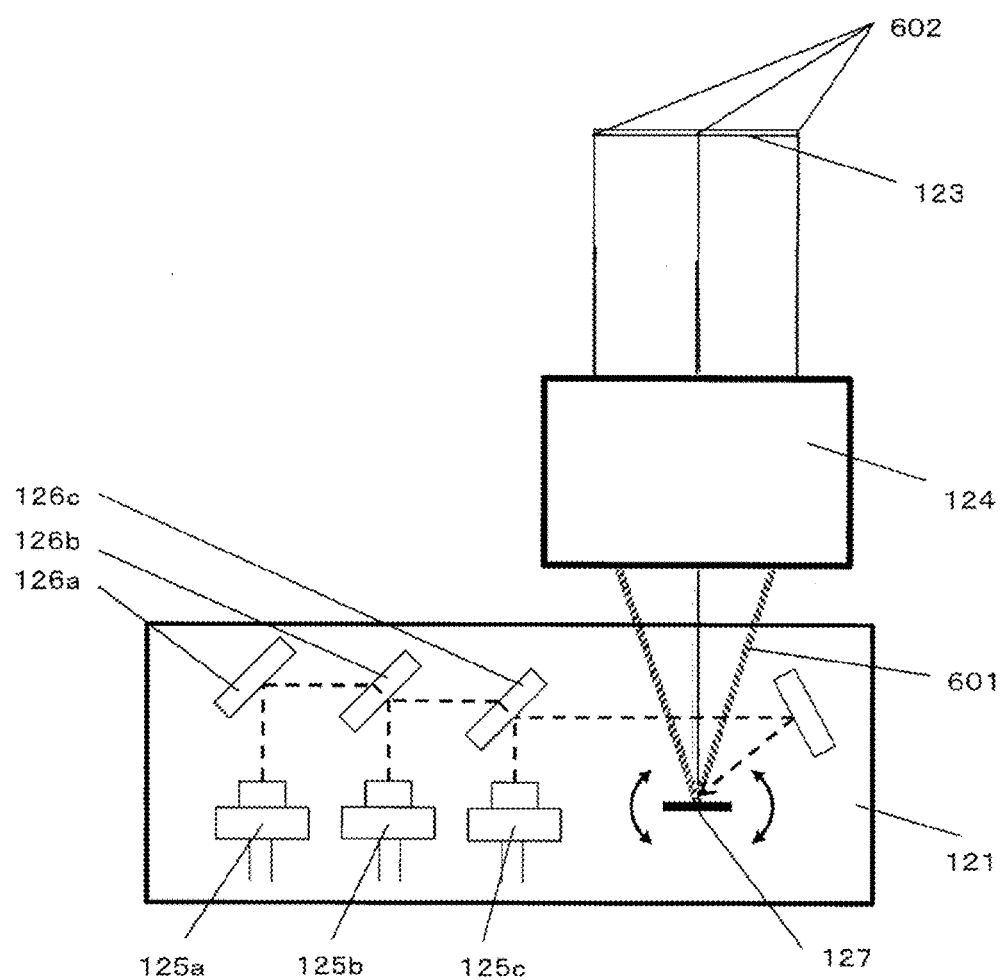
FIG. 6 is a view illustrating a structure of the image display device according to the exemplary embodiment.

FIG. 6 is a view illustrating a structure of the image display device according to the present exemplary embodiment. FIG. 6 is a configuration diagram illustrating a configuration where scanning optical module 121, f-θ lens 124 and screen 123 are combined.

Laser beam 601 emitted from scanning optical module 121 is adjusted to be perpendicularly incident to screen 123 through f-θ lens 124. In this case, f-θ lens 124 is disposed such that focal point 602 is near the light receiving surface of the lens arrays of screen 123.

Further, it has become obvious as a result of the experiment that, when scanning optical module 121 scans the laser beam, the lens pitch in the high-speed axis direction is particularly important. Therefore, a lenticular lens sheet has been used for screen 123.

In the present exemplary embodiment, the beam diameter (D) of laser beam 601 is an important matter, and the beam diameter (D) of laser beam 601 is desirably smaller than the dimension of the lens pitch (Px). Therefore, an effective mirror diameter of scanning mirror 127 is desirably 0.8 mm or more to further condense laser beam 601. Further, a weight of the mirror increases and a deflection angle of the mirror becomes small as the effective mirror diameter increases. Therefore, the effective mirror diameter is desirably 1.5 mm or less. Hence, the effective mirror diameter of scanning mirror 127 is desirably between 0.8 mm and 1.5 mm.

Figure 7A:
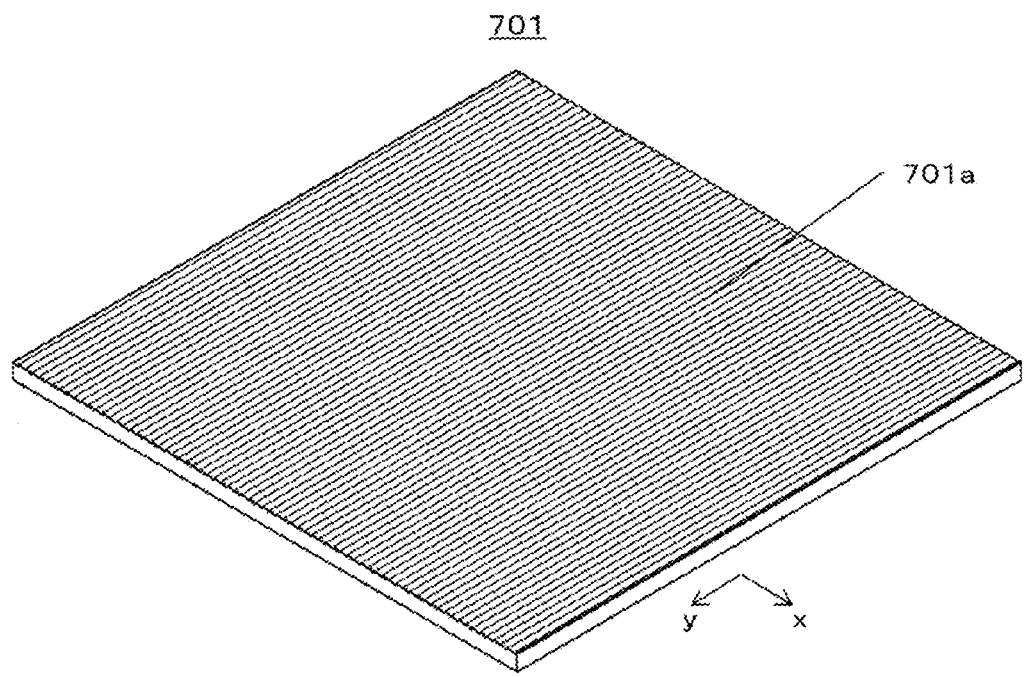
FIGS. 7A and 7B are views illustrating configurations of a screen according to the exemplary embodiment.
Figure 7B:
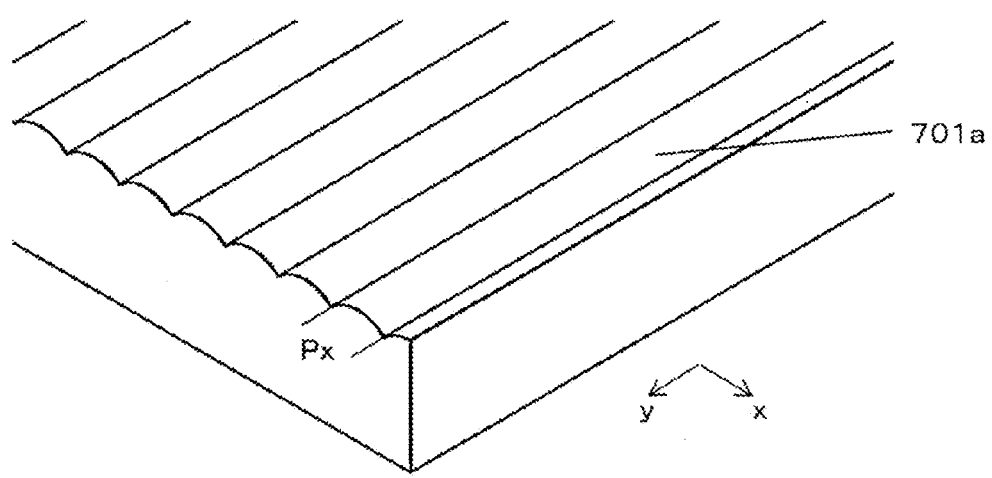

FIG. 7A and FIG. 7B is views illustrating a configuration diagram of the screen according to the present exemplary embodiment, and lenticular lens 701 is used for screen 123. FIG. 7A is a view illustrating the screen for which the lenticular lens is used. FIG. 7B is a view of enlarged lenticular lens 701.

Lenticular lens 701 adopts a structure which includes lens surface 701a on a main surface at one side, and has lens pitch Px only in the high-speed axis direction, i.e., the x axis direction. When lenticular lens 701 illustrated in FIG. 7A is applied to screen 123 illustrated in FIG. 6, laser beam 601 incident to lenticular lens 701 is configured to be perpendicularly incident and condensed by f-θ lens 124. FIGS. 8A and 8B illustrate experiment results in this case.

FIGS. 8A and 8B are tables for comparing various evaluation indices of the image display device according to the present exemplary embodiment. The various evaluation indices are a value obtained by dividing the lens pitch (Px) by the beam diameter (D) of the laser beam, the speckle contrast and display roughness. FIG. 8A is a table for comparing the various indices when the optical magnification of virtual image optical system 122 is set to four times. Further, FIG. 8B is a table for comparing the various indices when the optical magnification of virtual image optical system 122 is set to twenty times. In this regard, the laser beam diameter (D) indicates a value of a position of a beam waist condensed by f-θ lens 124, i.e., a value near the light receiving surface of screen 123.

When the optical magnification of virtual image optical system 122 illustrated in FIG. 8A is four times, speckle contrast is suppressed at 10% or less both at the center of screen 123 and the surroundings of screen 123 in a range in which the value obtained by dividing the lens pitch (Px) by the beam diameter (D) of the laser beam is between 1.0 and 2.0, and a good result for display roughness is obtained.

Further, when the optical magnification of virtual image optical system 122 is twenty times, speckle contrast is suppressed at 10% or less both at the center of screen 123 and the surroundings of screen 123 in a range in which the value obtained by dividing the lens pitch (Px) by the beam diameter (D) of the laser beam is between 1.0 and 1.25, and a good result for display roughness is obtained and a result that selection tolerance of the lens pitch (Px) can be expanded is obtained.

It is important in the present exemplary embodiment that one pixel is uniformly illuminated by a laser beam. Therefore, when the image display device employs the configuration illustrated in FIG. 6, it is desirable to adopt a lighting manner for lighting up at least one of red, blue and green laser light sources once.

Further, in the present exemplary embodiment, the beam diameter of laser beam 601 is an important matter. Therefore, when the image display device employs the configuration illustrated in FIG. 6, a transverse mode in laser light sources 125a, 125b and 125c is desirably a single mode.

Figure 9A:
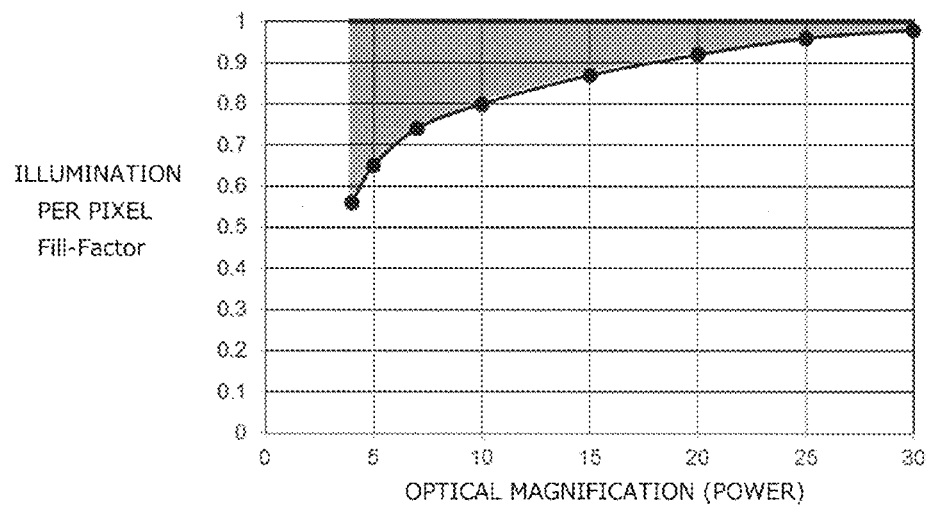
FIGS. 9A and 9B are graphs for illustrating relations between an optical magnification of a virtual image optical system and the various evaluation indices.
Figure 9B:
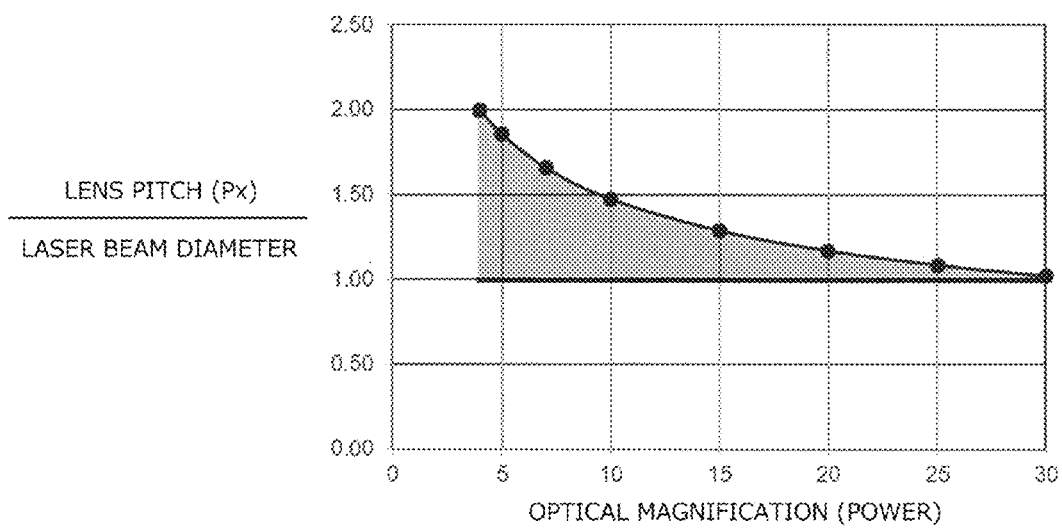

FIGS. 9A and 9B are graphs for illustrating relations between the optical magnification of the virtual image optical system and the various evaluation indices. FIG. 9A is a graph illustrating a relationship between the optical magnification of virtual image optical system 122 and illumination Fill-Factor per pixel. The horizontal axis indicates the optical magnification of virtual image optical system 122, and the vertical axis indicates illumination Fill-Factor per pixel. Further, FIG. 9B is a graph illustrating a relationship between the optical magnification of virtual image optical system 122, and a value obtained by dividing the lens pitch (Px) by the beam diameter (D) of the laser beam. The horizontal axis indicates the optical magnification of virtual image optical system 122, and the vertical axis indicates a value obtained by dividing the lens pitch by the beam diameter (D) of the laser beam.

The display roughness illustrated in FIGS. 8A and 8B can be expressed as illustrated in FIG. 9A when a minimum value of an area of the illumination area which can be illuminated by the laser beam in an area of one pixel 504 in an image display area is expressed as Fill-Factor. FIG. 9A illustrates that, when the optical magnification of the virtual image optical system falls in a range of four times and thirty times, an area of Fill-Factor which does not make a displayed video image rough is indicated by a hatching. When the entire area of one pixel 504 can be illuminated by the laser beam, Fill-Factor is 1, and it is possible to display a video image which is not rough.

When the optical magnification is low, i.e., when, for example, the optical magnification is four times, roughness of a video image is not observed as long as almost 60% of an area of one pixel is illuminated. Consequently, Fill-Factor can be set to a range of 0.56 to 1.0. As the optical magnification of virtual image optical system 122 increases, a focusing plane on screen 123 is enlarged. Consequently, human eyes can also observe an area which is not illuminated. As a result, necessary Fill-Factor increases, and, when the optical magnification is thirty times, a result is obtained such that Fill-Factor is 0.95 to 1.0 and a substantially entire area of one pixel needs to be illuminated.

FIG. 9B illustrates the above result as a relationship between the optical magnification of the virtual image optical system and an upper limit of a value obtained by dividing the lens pitch (Px) by the beam diameter (D) of the laser beam. In this regard, the upper limit of the value obtained by dividing the lens pitch (Px) by the beam diameter (D) of the laser beam is an effective numerical value from viewpoints of speckle contrast and video image roughness (Fill-Factor).

When the value obtained by dividing the lens pitch (Px) by the beam diameter (D) of the laser beam is less than 1.0, speckle noise generates a glaring impression. Meanwhile, the upper limit of the value obtained by dividing the lens pitch (Px) by the beam diameter (D) of the laser beam is determined by a value determined based on Fill-Factor in FIG. 9A. Therefore, it has become obvious that, when both are taken into account, the hatching in FIG. 9B is an effective range.

It is found from the above result that, when the virtual image optical system having an optical magnification of four times is used, a value obtained by dividing the lens pitch (Px) which is effective from viewpoints of speckle contrast and video image roughness by the relationship (D) of the laser beam diameter is in a range between 1.0 and 2.0. When the optical magnification is thirty times, the value obtained by dividing the effective lens pitch (Px) by the beam diameter (D) of the laser beam merely falls within a range between 1.0 and 1.02.

It has been found that, when the upper limit value is approximately expressed, the upper limit value can be expressed as equation (1).

$$\left(\frac{A}{32}\right)^{-\frac{1}{3}} = \frac{Px}{D} \quad (1)$$

Further, it has been found that the area indicated by the hatching area illustrated in FIG. 9B can be expressed as equation (2).

$$1.0 \leq \frac{Px}{D} \leq \left(\frac{A}{32}\right)^{-\frac{1}{3}} \quad (2)$$

In equation (1) and equation (2), Px represents the lens pitch (μm) in the x axis direction, D represents the beam diameter (μm) of a laser beam and A represents the optical magnification (power), and optical magnification A of virtual image optical system 122 to which these equations are applicable is in a range of $4 \leq A \leq 30$.

The above result indicates that the effective optical magnification (A) is in the range of $4 \leq A \leq 30$ from viewpoints of speckle noise and video image roughness by using equation (2). When the optical magnification is twenty five times or more, a tolerance of the beam diameter (D) of the laser beam with respect to the lens pitch (Px) is very narrow. Particularly, when the optical magnification is more than thirty times, it is necessary to substantially match the lens pitch (Px) and the beam diameter (D) of the laser beam. Therefore, it is desirable to set an application range of optical magnification A including a design likelihood during manufacturing to $4 \leq A \leq 25$.

In the present exemplary embodiment, a laser beam is incident to lens surface 701a of lenticular lens 701. However, it has been confirmed that, from viewpoints of a glaring impression and video image roughness, it is possible to provide a similar effect even when the laser beam is incident from a direction at a plane side positioned at a side opposite to lens surface 701a. Meanwhile, there is also a problem that external light becomes stray light, and a contrast lowers. Therefore, when this point is taken into account, the laser beam is desirably incident to lens surface 701a of lenticular lens 701 similar to the present exemplary embodiment.

Further, in the present exemplary embodiment, relational equations of equation (1) and equation (2) are defined assuming that a shape of the laser beam is substantially circular. However, when the shape of the laser beam is elliptical, the lens pitch (Px) in the x axis direction can be replaced with an expression using the beam diameter (Dx) of the laser beam in the x axis direction and be expressed. Further, the lens pitch (Py) in the y axis direction can be replaced with an expression using the beam diameter (Dy) of the laser beam in the y axis direction and be expressed.

Furthermore, in the present exemplary embodiment, a configuration of screen 123 for which lenticular lens 701 is used has been described. However, the screen employing a cross lenticular configuration where lenticular lenses cross at a right angle can be also used. This case has an advantage that it is possible to widen a viewing angle in the y axis direction of a display image and improve visibility.

Figure 10A:
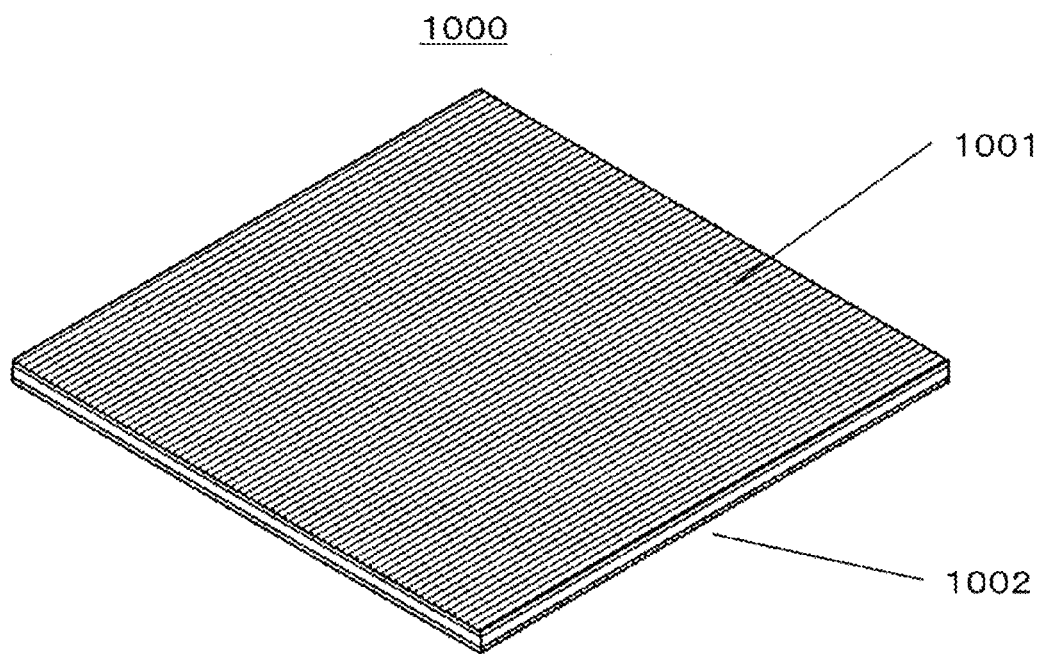
FIGS. 10A and 10B are views illustrating a configuration of another screen according to the exemplary embodiment.
Figure 10B:
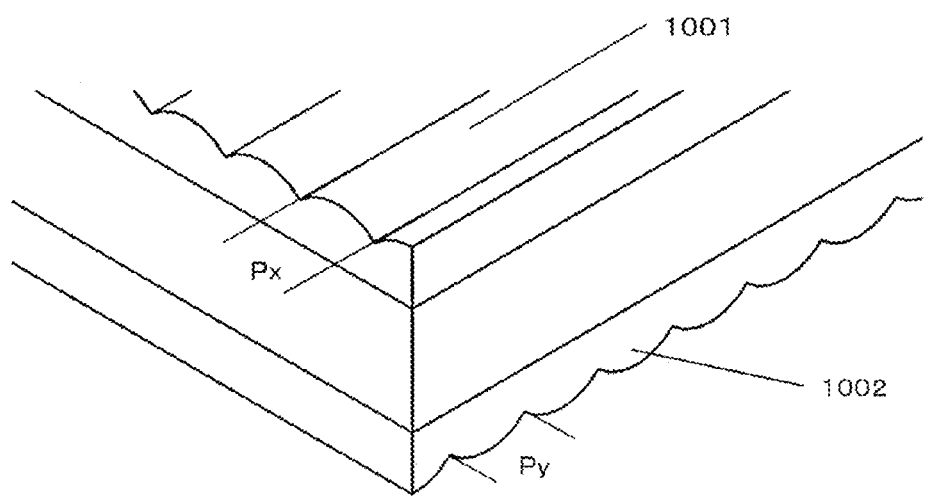

FIGS. 10A and 10B are views illustrating a configuration of another screen according to the present exemplary embodiment, and screen 123 is formed by the cross lenticular configuration. FIG. 10A is a view illustrating the screen of the cross lenticular configuration. FIG. 10B is a view of enlarged cross lenticular screen 1000.

Cross lenticular screen 1000 formed by the cross lenticular configuration includes screen top surface 1001 which adopts a lens structure, and screen back surface 1002 which adopts a lens structure. Cross lenticular screen 1000 includes pitch Px in the x axis direction and pitch Py in the y axis direction. In this regard, the x axis is an axis parallel to the high-speed axis, and the y axis is an axis parallel to the low-speed axis. Lens pitch Py in the y axis direction is not correlated with the beam diameter (D) of the laser beam in terms of speckle noise. Consequently, it has been confirmed that a lower limit of the lens pitch is expanded and a video image becomes smooth in the range expressed by equation (3).

$$0.2 \leq \frac{Px}{D} \leq \left(\frac{A}{32}\right)^{-\frac{1}{3}} \quad (3)$$

The optical magnification of virtual image optical system 122 to which this equation (3) is applicable is in the range of 4≤A≤30.

The microlens arrays having cycles Px and Py can also provide a similar effect. However, it is necessary to dually overlay the microlens arrays to suppress unevenness in brightness in the screen. It is necessary to provide an interval between the respective microlens arrays in order to provide the effect of suppressing unevenness in brightness. Therefore, there are drawbacks that it is difficult to manufacture the microlens arrays and a display image blurs. Accordingly, the cross lenticular configuration is more suitable.

In the case of the cross lenticular configuration, it has been confirmed that, when a relationship between the lens pitch (Px) in the x direction and the lens pitch (Py) in the y direction satisfies Px≥Py, a video image becomes more smooth.

Figure 11A:
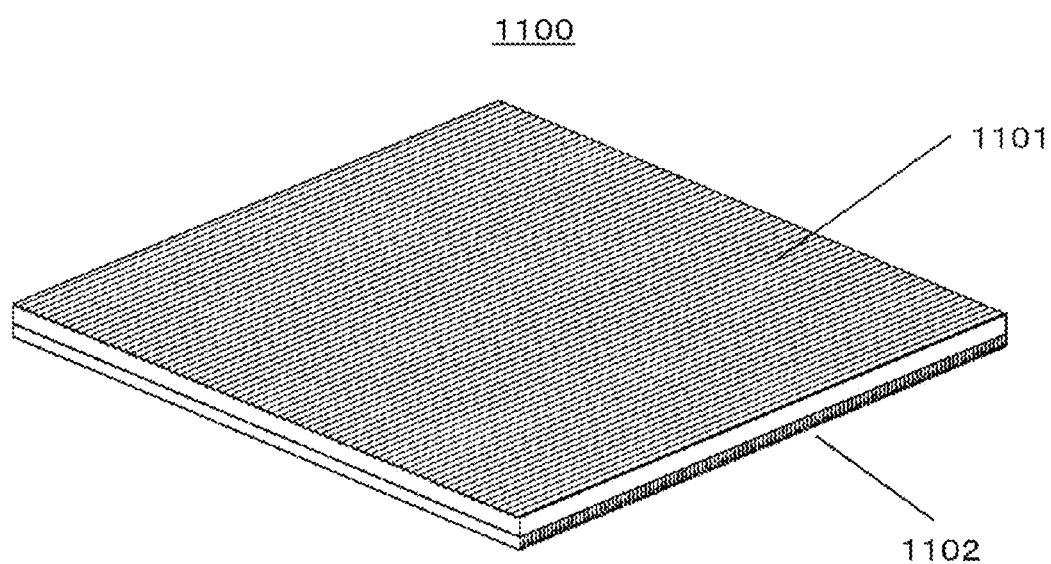
FIGS. 11A and 11B are views illustrating a configuration of another screen according to the exemplary embodiment.
Figure 11B:
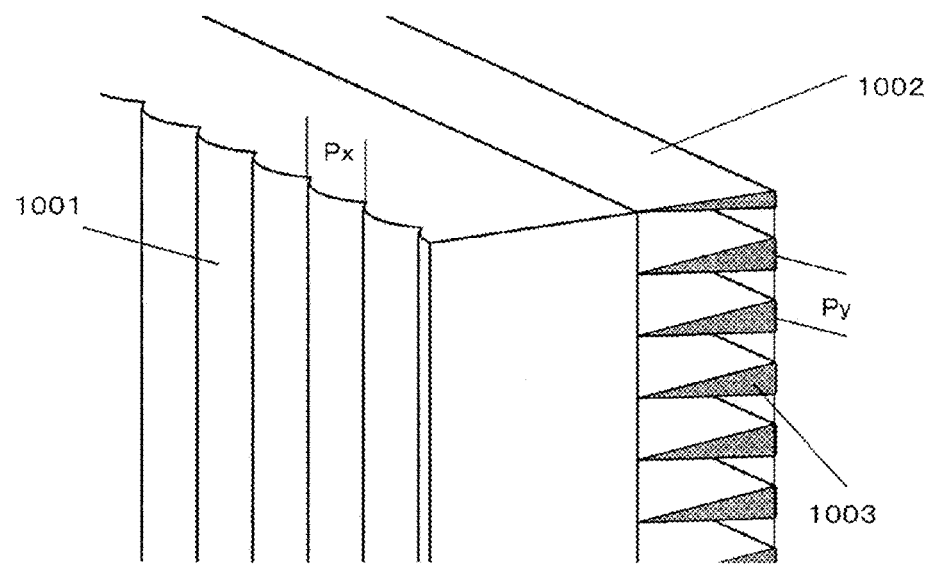

Further, by adopting a louver (eave) structure for the lens structure in the y axis direction instead of the screen of the cross lenticular configuration, it is possible to improve a contrast of a display image. FIGS. 11A and 11B are configuration diagrams of a screen formed by combining a lenticular lens and a louver structure.

FIGS. 11A and 11B are views illustrating a configuration of another screen according to the present exemplary embodiment, and the screen is formed by combining the lenticular lens and the louver structure.

Screen 1100 formed by combining the lenticular lens and the louver structure includes screen top surface 1001 which is composed of the lenticular lens and screen back surface 1002 which is composed of the louver structure.

Screen 1100 illustrated in FIGS. 11A and 11B adopts the lenticular lens structure in the high-speed (x axis) direction, and has a lens pitch which is in a lens pitch range expressed by equation (1). Meanwhile, a lower limit of an inter-louver pitch is expanded similarly to a case where the lenticular lens is used, and Py can be set to a range expressed by equation (2).

The louver structure adopts a structure including optical absorber 1003 in which a wedge-shaped groove is formed in a PET (polyethylene terephthalate) film and the groove is filled with carbon. By adopting such a structure, it is possible to obtain an effect of diffusing a laser beam perpendicularly incident to the screen due to surface reflection since a light entrance angle with respect to the PET material is shallow. Further, the entrance angle of external light such as solar light entering an emission side of screen 1100 with respect to a wedge surface is deep and surface reflection on a PET material surface is poor, and therefore the light enters a carbon material side. As a result, the entering external light is absorbed by the carbon material and reflection on the screen surface is suppressed. Consequently, it is possible to improve a photopic contrast and further improve display quality. A material which absorbs light, other than the carbon material, can be used for a material to fill in a cavity.

Also in the case of using the louver structure, it has been confirmed that, when a relationship between the lens pitch (Px) in the x direction and the inter-louver pitch (Py) in the y direction satisfies Px Py, a video image becomes more smooth likewise in the case of the cross lenticular configuration.

When a microlens array and an aperture array are used in combination as proposed by prior art as a measure for suppressing a decrease in the photopic contrast caused by external light, precision to adjust an interval between the microlens array and the aperture array is necessary. The combination of the microlens array and the aperture array causes an interference pattern. Therefore, by disposing the aperture array orthogonally to the lenticular lens as in the present exemplary embodiment, it is possible to display video images in which interference fringes and glares are suppressed while improving the contrast.

Meanwhile, when the louver structure and the microlens array are used in combination, an interference fringe called moiré is generated and cannot be removed. Therefore, it is necessary to dispose the aperture array orthogonally to the lenticular lens as in the present exemplary embodiment.

Also in the case of using the louver structure, it has been confirmed that, when a relationship between the lens pitch in the x direction and the inter-louver pitch in the y direction satisfies Px≥Py, a video image becomes more smooth likewise in the case of the cross lenticular configuration.

The configuration described in the present exemplary embodiment is a configuration example, and the present exemplary embodiment can be naturally carried out by configurations other than modes illustrated in the drawings.

The present disclosure reduces speckle noise while suppressing a decrease in a resolution of display images and, consequently, is applicable to an image display device or the like which uses laser light sources.

What is claimed is:
1. An image display device comprising:
a light source which emits laser light;
a scanner which scans the laser light emitted from the light source;
a screen on which an image is formed by the laser light scanned with the scanner;
a virtual image optical system which generates a virtual image of the image by the laser light having transmitted through the screen; and
a screen incident angle correcting optical system which orients the laser light scanned with the scanner toward the screen, wherein:
the scanner performs at least first scanning and second scanning that has a scanning direction different from a scanning direction of the first scanning, and makes a scanning speed of the first scanning higher than a scanning speed of the second scanning,
the virtual image optical system generates the virtual image larger than the image formed on the screen,
the screen incident angle correcting optical system makes the laser light perpendicularly incident to a light receiving surface of the screen,
the screen includes a lenticular lens having a lens pitch in a direction parallel to the scanning direction of the first scanning and a louver structure having an inter-louver pitch in a direction parallel to the scanning direction of the second scanning, the lens pitch of the lenticular lens is larger than a beam diameter of the laser light near the light receiving surface of the screen, and the inter-louver pitch of the louver structure is smaller than the lens pitch of the lenticular lens.

2. The image display device according to claim 1, wherein the screen incident angle correcting optical system is a telecentric f-θ lens.

3. The image display device according to claim 1, wherein the screen causes the lenticular lens to function as a light receiving surface, and causes a wedge surface of the louver structure to function as an emission surface.

4. The image display device according to claim 1, wherein the louver structure includes a reflecting function of reflecting the laser light and an absorbing function of absorbing the laser light, and switches the reflecting function and the absorbing function according to an incident angle of the laser light.

5. The image display device according to claim 1, wherein a transverse mode in the light source is a single mode.

6. The image display device according to claim 1, wherein at least one of a red light source, a green light source and a blue light source constituting the light source lights up only once while one pixel is illuminated.

7. The image display device according to claim 1, wherein a diameter of a mirror constituting the scanner is from 0.8 mm to 1.5 mm both inclusive.

8. An image display device comprising:
a light source which emits laser light;
a scanner which scans the laser light emitted from the light source;
a screen on which an image is formed by the laser light scanned with the scanner;
a virtual image optical system which generates a virtual image of the image by the laser light having transmitted through the screen; and
a screen incident angle correcting optical system which orients the laser light scanned with the scanner toward the screen, wherein:
the scanner performs at least first scanning and second scanning that has a scanning direction different from a scanning direction of the first scanning, and makes a scanning speed of the first scanning higher than a scanning speed of the second scanning, the virtual image optical system generates the virtual image larger than the image formed on the screen, the screen incident angle correcting optical system makes the laser light perpendicularly incident to a light receiving surface of the screen, the screen includes a first lenticular lens including a first lens pitch in a direction parallel to the scanning direction of the first scanning and a second lenticular lens including a second lens pitch in a direction parallel to the scanning direction of the second scanning, the first lenticular lens and the second lenticular lens are arranged along an optical axis on which the laser light is incident, and the second lens pitch of the second lenticular lens is smaller than the first lens pitch of the first lenticular lens.

9. The image display device according to claim 8, wherein the first lenticular lens and the second lenticular lens are disposed at a top surface of the screen and at a back surface of the screen, respectively.

10. The image display device according to claim 8, wherein the first lens pitch of the first lenticular lens satisfies the following equation, $$0.2 \leq \frac{Px}{D} \leq \left(\frac{A}{32}\right)^{-\frac{1}{3}}$$

where Px represents the first lens pitch of the first lenticular lens, D represents a beam diameter of the laser light, and A represents effective optical magnification of the virtual image optical system.

11. The image display device according to claim 8, wherein the scanning direction of the first scanning is orthogonal to the scanning direction of the second scanning.

* * * * *